United States Patent [19]

Artz

[11] 3,985,726

[45] Oct. 12, 1976

[54] BENZISOTHIAZOLE AND INDAZOLE AZO COMPOUNDS

[75] Inventor: Klaus Artz, Muttenz, Switzerland

[73] Assignee: Ciba-Geigy AG, Basel, Switzerland

[22] Filed: Nov. 21, 1973

[21] Appl. No.: 418,007

Related U.S. Application Data

[63] Continuation of Ser. No. 166,980, July 28, 1971, abandoned.

[30] Foreign Application Priority Data

Aug. 7, 1970   Switzerland................. 11912/70

[52] U.S. Cl............................. 260/162; 260/156; 260/158; 260/160; 260/163
[51] Int. Cl.²................................... C09B 29/08
[58] Field of Search.................. 260/162, 163, 158

[56] References Cited

UNITED STATES PATENTS

| | | | |
|---|---|---|---|
| 2,314,440 | 3/1943 | Bock et al.................. | 260/207.1 |
| 2,361,618 | 10/1944 | Felix et al................. | 260/207.1 |
| 3,360,508 | 12/1967 | Sureau et al.............. | 260/163 |
| 3,455,898 | 7/1969 | Seefelder et al......... | 260/158 |
| 3,697,501 | 10/1972 | Dehnert.................... | 260/163 |
| 3,718,641 | 2/1973 | Muller et al............... | 260/158 |

FOREIGN PATENTS OR APPLICATIONS

| | | | |
|---|---|---|---|
| 840,512 | 6/1938 | France..................... | 260/207.1 |
| 491,793 | 9/1938 | United Kingdom....... | 260/207.1 |
| 1,176,797 | 1/1970 | United Kingdom....... | 260/207.1 |
| 1,176,798 | 1/1970 | United Kingdom....... | 260/207.1 |

*Primary Examiner*—Natalie Trousoe
*Assistant Examiner*—R. W. Ramsuer
*Attorney, Agent, or Firm*—Joseph G. Kolodny; Edward McC. Roberts; Prabodh I. Almaula

[57] ABSTRACT

An azo compound free of sulphonic acid groups, of the formula

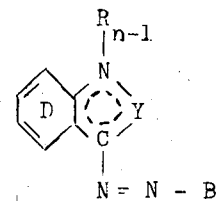

wherein B is the radical of a coupling component of the phenol or naphthol, pyrazolone, pyridone, aminopyrazole, enolisable keto compound or alkylaniline series and Y is a sulphur atom or a nitrogen atom, R represents a hydrocarbon radical or a hydrogen atom, and $n = 1$ or 2, $n$ being 1 if Y= —S— and $n$ being 2 if Y= —N=, and wherein the ring D can carry yet further substituents and the dyestuff molecule contains at least one carboxyl group, and useful in dyeing and printing leather, wool, silk and synthetic fibers such as acrylic, acrylonitrile, polyamide and especially aromatic polyester fibers.

3 Claims, No Drawings

BENZISOTHIAZOLE AND INDAZOLE AZO COMPOUNDS

This is a continuation of application Ser. No. 166,980, filed on July 28, 1971 now abandoned.

The present invention relates to new valuable azo compounds which are free of sulphonic acid groups, of the formula

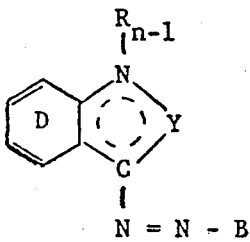

wherein B represents a radical of a coupling component and Y represents a sulphur atom or a nitrogen atom, R represents a hydrocarbon radical or a hydrogen atom, and $n = 1$ or 2, $n$ being 1 if $Y = -S-$ and $n$ being 2 if $Y = -N=$, and wherein the ring D can carry yet further substituents and the dyestuff molecule contains at least one carboxyl group.

The new azo compounds are obtained if a diazo compound of an amine of the formula

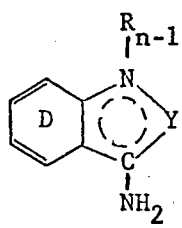

is coupled with a coupling component, it being necessary for the two components together to contain at least one carboxyl group and to be free of sulphonic acid groups.

B is preferably the radical of a coupling component which is bonded directly or via an azophenyl radical, especially a radical of a phenol or naphthol, of a pyrazolone, of a pyridone, of an aminopyrazole, of an enolisable keto compound or of an alkylaniline.

The carboxyl group can also be in the form of a salt, for example a potassium, sodium or ammonium salt.

Amongst the dyestuffs according to the invention, those are preferred which correspond to the general formula

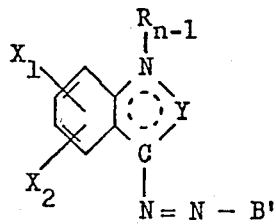

wherein $X_1$ and $X_2$ are identical or different substituents which do not confer solubility in water, such as hydrogen atoms, halogen atoms or nitro, alkoxy, acylamino, nitrile, carbalkoxy, alkylsulphone, carboxyl or trifluoromethyl groups, and B' is a coupling component of the aniline, phenol or pyrazolone series, the dyestuff molecule containing, at the same time, one or more carboxyl groups. Preferably, only the coupling component contains the carboxyl groups.

Particularly preferred cases are those of the formula

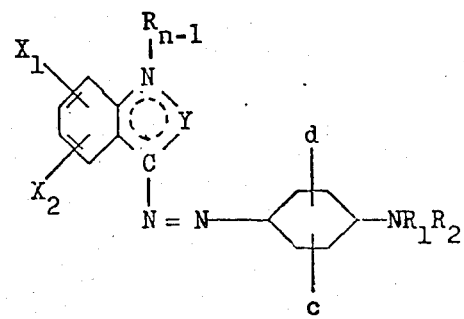

wherein $d$ is a hydrogen atom, a halogen atom, a low molecular alkyl, alkoxy or mercapto group, an aryl, arylmercapto or aryloxy group, or a cycloalkyl, cycloalkylmethyl or benzyl radical, and $c$ is the same or is an acylamino radical, and $R_1$ and $R_2$ are hydrogen atoms or optionally substituted alkyl radicals, and especially the dyestuffs of the formula

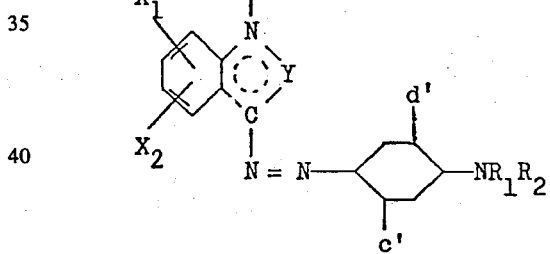

wherein the radicals $c'$ and $d'$ are hydrogen atoms or methyl, ethyl, methoxy, ethoxy, phenylthio or phenoxy radicals.

The group $c'$ can, additionally to the abovementioned groups, also denote a chlorine or bromine atom, a trifluoromethyl group and an acylamino group which is optionally alkylated, preferably methylated, at the nitrogen atom, in which the acyl radical is the radical of an organic monocarboxylic acid or of an organic monosulphonic acid, such as methanemonosulphonic acid, ethanemonosulphonic acid or p-toluenemonosulphonic acid, or the radical of a carbamic acid or of a carbonic acid monoester or monoamide, such as phenoxycarbonyl, methoxycarbonyl and aminocarbonyl, or a radical of a dicarboxylic acid of which the second acid radical is present as a free —COOH group.

The groups $R_1$ and $R_2$ can be hydrogen atoms or lower alkyl groups, that is to say alkyl groups containing 1 to 4, preferably 2 to 4, carbon atoms, such as methyl, ethyl, n-propyl or n-butyl groups, which can be substituted in the usual manner, such as, for example, benzyl groups, β-phenylethyl groups, halogenated alkyl groups, such as β-chloroethyl, β,β,β-trifluoroethyl or β,γ-dichloropropyl groups, β-cyanoethyl groups, alk-oxyalkyl groups, such as β-ethoxyethyl or δ-methoxybutyl groups, glycidyl groups, hydroxyalkyl groups, such as β-hydroxyethyl or β,γ-hydroxypropyl groups, nitroalkyl groups, such as β-nitroethyl groups, carbalkoxy groups, such as β-carbo-(methoxy-, ethoxy- or propoxy-)ethyl groups, wherein the terminal alkyl group can carry nitrile, carbalkoxy, acyloxy and amino groups in the ω-position, or β- or γ-carbo-(methoxy- or ethoxy-)propyl groups, alkylcarbonylaminoalkyl groups, such as β-(acetyl-or formyl-)aminoethyl groups, alkylcarbonyloxyalkyl groups, such as β-acetoxyethyl, β,γ-diacetoxypropyl and γ-butyryloxypropyl groups, β-arylsulphonylalkyl groups, such as β-phenylsulphonylethyl, β-toluenesulphonylethyl or β-(p-chlorobenzenesulphonyl)-ethyl groups, alkyl- or aryl-carbamoyloxyalkyl groups, such as β-methylcarbamyloxyethyl and β-phenylcarbamyloxyethyl groups, alkyloxycarbonyloxyalkyl groups, such as β-methoxy-, ethoxy- or isopropoxycarbonyloxyethyl, γ-acetamidopropyl, β-(p-nitrophenoxy)-ethyl, β-(p-hydroxyphenoxy-ethyl, β-(β'-acetylethoxycarbonyl)-ethyl, β-[(β'-cyano-, hydroxy-, methoxy- or acetoxy-)ethoxycarbonyl]ethyl, cyanoalkoxyalkyl, β-carboxyethyl, β-acetylethyl, γ-aminopropyl, β-diethylaminoethyl, β-cyanoacetoxyethyl, β-benzoyl-β- and (p-alkoxy- or phenoxy-benzoyl) -oxyethyl groups, and if the diazo component does not contain any carboxyl groups, at least one of the radicals $R_1$, $R_2$, c or d must contain a carboxyl group.

As examples of coupling components which fall under the above definition, the following amines may be mentioned:

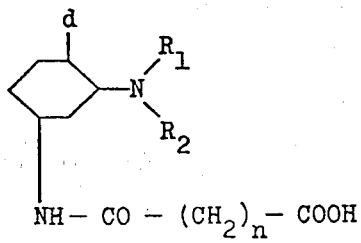

wherein n = 0, 1, 2 or 3,

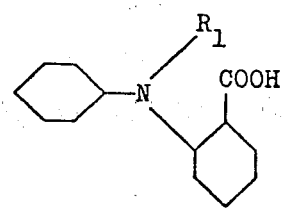

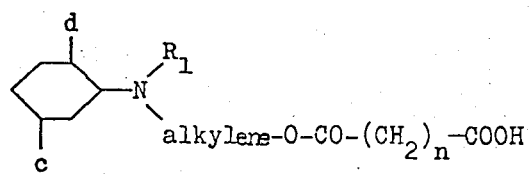

wherein n is the same as above,

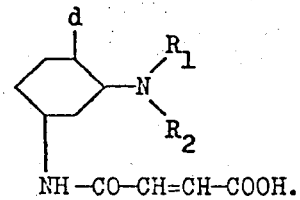

As further examples of coupling components containing carboxyl groups, which do not belong to the aniline series, there may be mentioned the compounds of the following formulae:

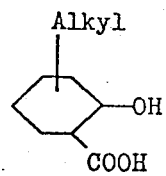

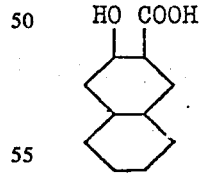

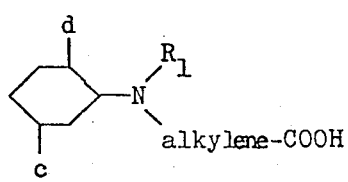      (n = 0, 1, 2)

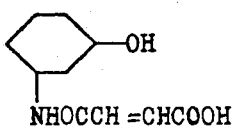

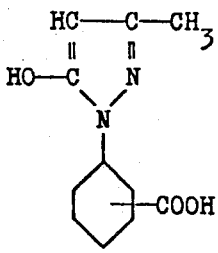

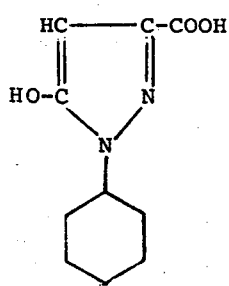

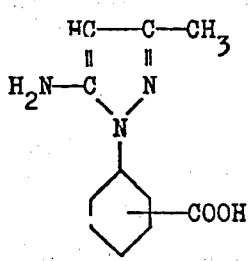

In the general formula of the diazo radical

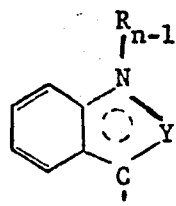

Y represents either a sulphur atom or a nitrogen atom. Depending on whether Y is divalent or trivalent, the position of the double bond electrons drawn as a broken circle changes, namely as in the formulae below:

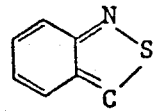

and

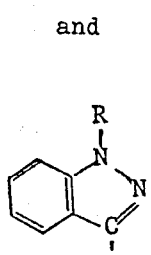

As diazotisable amines of the formula (2) there may for example be mentioned 3-amino-2,1-benzisothiazole as well as its 4-alkyl, alkoxy, halogen or nitro, 5-alkyl, halogen, nitro, alkylsulphonyl, N-alkyl- or N,N-dialkyl-sulphonylamido or acylamine, 6-halogen, nitro or nitrile, 7-halogen or nitro, 4,7-dialkyl, 5,7-dihalogen or dinitro, 4-alkyl-6-cyano, 5-halogeno-7-cyano, 5-nitro-7-halogeno, 5-cyano-7-halogeno or 4,6-dihalogeno-5-cyano derivatives, 3-aminoindazole, 3-amino-5-nitro indazole, 3-amino-5-chloro indazole, 3-amino-5-methyl-indazole, 3-amino-6-methoxy-indazole and 3-amino-5,7-dimethyl-indazole.

The diazotisation of the diazo components mentioned can for example be effected with concentrated phosphoric acid and sodium nitrite or preferably with a solution of nitrosylsulphuric acid in concentrated sulphuric acid.

The coupling can also be carried out in a manner which is in itself known, for example in a neutral to acid medium, optionally in the presence of sodium acetate or similar buffer substances or catalysts which influence the coupling speed, such as, for example, dimethylformamide, pyridine or its salts.

The new dyestuffs, their mixtures with one another and their mixtures with other azo dyestuffs are outstandingly suitable for dyeing and printing leather, wool, silk and above all synthetic fibres, such as, for example, acrylic or acrylonitrile fibres, of polyacrylonitrile or of copolymers of acrylonitrile and other vinyl compounds, such as acrylic esters, acrylamides, vinylpyridine, vinyl chloride or vinylidene chloride, or of copolymers of dicyanaoethylene and vinyl acetate, as well as of acrylonitrile block copolymers, fibres of polyurethanes, polypropylene fibres and also cellulose triacetate and cellulose 2½-acetate and especially fibres of polyamides, such as nylon-6, nylon-6,6 or nylon-12, or of aromatic polyesters, such as those of terephthalic acid and ethylene glycol or 1,4-dimethylcyclohexane, and copolymers of terephthalic and isophthalic acid and ethylene glycol.

For dyeing in aqueous liquors, the water-insoluble dyestuffs are appropriately used in a finely divided form and dyeing is carried out with the addition of dispersing agents, such as sulphite cellulose waste lye or synthetic detergents, or a combination of different wetting agents and dispersing agents. As a rule it is advisable to convert the dyestuffs to be used, before dyeing, into a dyeing preparation which contains a dispersing agent and finely divided dyestuff in such a form that on dilution of the dyestuff preparations with water a fine dispersion results. Such dyestuff preparations can be obtained in a known manner, for example by grinding the dyestuff in the dry or wet form, with or without the addition of dispersing agents in the grinding process.

To achieve strong dyeings on polyethylene terephthalate fibres it proves advisable to add a swelling agent to the dyebath, or to carry out the dyeing process under pressure at temperatures above 100° C, for example at 120° C. Suitable swelling agents are aromatic carboxylic acids, for example salicylic acid, phenols, such as, for example, o- or p-hydroxydiphenyl, and aromatic halogen compounds, such as o-dichlorobenzene, or diphenyl.

For thermofixing the dyestuff, the padded polyester fabric is heated, appropriately after prior drying, for example in a warm stream of air, to temperatures of above 100° C, for example between 180° and 210° C.

The dyeings obtained in accordance with the present process can be subjected to an after-treatment, for example by heating with an aqueous solution of a non-ionic detergent.

Instead of being applied by impregnation, the dyestuffs indicated can, according to the present process, also be applied by printing. For this purpose a printing ink, for example, is used, which contains the finely disperse dyestuff in addition to the auxiliaries which are customary in printing, such as wetting agents and thickeners.

The present process yields strong dyeings and prints of good fastness properties.

The new water-insoluble dyestuffs can also be used for the spin dyeing of polyamides, polyesters and polyolefines. The polymer to be dyed in appropriately mixed, in the form of powders, granules or chips, as a ready-to-use spinning solution or in the fused state, with the dyestuff which is introduced in the dry state or in the form of a dispersion or solution in a solvent, which is volatile if desired. After homogeneous distribution of the dyestuff in the solution or melt of the polymer, the mixture is processed in a known manner by casting, pressing or extrusion to give fibres, yarns, monofilaments, films and the like.

The new dyestuffs are also suitable for the multicolour printing of textile materials which consist of hydrophobic, synthetic, organic fibres which are free of amino groups, because resist effects are achievable on textile materials of such fibres with the new dyestuffs. Here, the procedure is that the textile material is padded with the new dyestuffs containing carboxyl groups, the padded textile material is dried and printed with an alkaline printing paste which can contain optical brighteners which are free of caboxyl groups, white pigments which are free of carboxyl groups or other dyestuffs which are free of carboxyl groups, the fabric is heat-set, and the salt of the dyestuff containing carboxyl groups is subsequently eluted from the printed areas.

As synthetic fibres which can be dyed or printed in this manner there may be mentioned acrylic fibres, fibres of polyurethanes, fibres based on polyepoxy compounds or polyolefine fibres, such as polypropylene, especially nickel-modified or unmodified polypropylene, and above all fibres of aromatic polyesters, such as those from terephthalic acid and ethylene glycol or 1,4-dimethylolcyclohexane, and of copolymers of terephthalic acid and isophthalic acid and ethylene glycol, as well as cellulose triacetate and cellulose 2½-acetate. The fibres to be printed must not contain any free amino groups.

Further possibilities are mixed fabrics of the above-mentioned fibres and hydrophilic fibres, especially cellulose fibres and wool fibres. Polyester-cotton and polyester-wool mixtures may also be mentioned.

The textile materials will as a rule be woven fabrics, knitted fabrics or other sheet-like structrues, such as fleeces (non-wovens).

The new dyestuffs containing caboxyl groups can be in the form of salts of volatile organic bases or in the form of ammonium salts.

The padding liquor will as a rule be aqueous. In addition to the dyestuff it can also contain, if required, further auxiliaries, such as sodium salts of highly concentrated naphthalenesulphonic acid-formaldehyde resins, sulphite cellulose waste lye products, condensation products of higher alcohols and ethylene oxide, polyglycol ethers of fatty acid amides and alkylphenols, sulphosuccinic acid esters or Turkey-red oil. The padding liquor can however also be a solution of the dyestuff.

After squeezing out to 20–200% by weight of th fibre weight, the textile material is dried. The drying can for example be effected with steam or preferably with a stream of warm air at between 70° and 150° C for 10 to 300 seconds.

Thereafter, the fabric is printed with an alkaline printing paste which contains a heat-resistant alkaline compound, such as an alkali carbonate, such as sodium carbonate or potassium carbonate, or above all alkali hydroxides, such as sodium hydroxide or potassium hydroxide. The amount of the alkali has to be so chosen that the dyestuff present on the fibre is reliably converted into the alkali salt. If the resist remains white, the resist paste can contain white pigments, such as titanium dioxide or zinc oxide. The printing paste furthermore contains the customary additives, such as thickeners, for example gum arabic or methylcellulose.

In order to achieve two colour prints, dyestuffs which are resistant to alkali, in particular dispersion dyestuffs, such as are listed, for example, in the Colour Index, will further be added to the printing paste. These dyestuffs must not contain any caboxyl groups.

Furthermore, optical brighteners which possess an affinity for the organic fabric (such as nylon fabric and above all cellulose acetate and polyester fabric) can also be introduced into the alkaline printing paste. In addition to a dispersion dyestuff free of carboxyl groups, the printing paste can also contain dyestuffs of other tinctorial categories, such as, for example, water-soluble or water-insoluble dyestuffs possessing fibre-reactive groups, such as dichlorotriazine or monochlorotriazine groups, chloroacetyl-amino groups and acrylamide groups. The use of water-soluble fibre-reactive dyestuffs is of interest particularly in those cases where mixed fabrics containing cellulose or containing wool, and especially mixed fabrics containing polyester fibres, are used as the substrate. If printing pastes with fibre-reactive dyestuffs are used, the alkali treatment can be adapted to the modern methods for fixing reactive dyestuffs (for example alkali-shock treatment).

Further possible dyestuffs for printing are also optical brighteners.

After printing, the textile material can be dried either with steam or with hot air or can, as it is, be subjected to fixing.

The fixing of the dyestuff or dyestuffs on the textile material is carried out hot at 100° to 260° C, preferably from 150° to 230° C, but at lower temperatures in the case of polymers of low softening point, preferably by means of dry heat (thermosol process), in suitable equipment for this purpose. Superheated steam can also be used. Prints on polypropylene are thermofixed at temperatures below 140° C.

After fixing, the printed material is washed. It can be washed either in organic or, preferably, in aqueous liquors. The usual surface-active agents or detergents are used for this purpose.

In the examples which follow the parts denote parts by weight unless otherwise stated and the percentages denote percentages by weight.

EXAMPLE 1

16.6 parts of 3-amino-5-nitro-2,1-benzisothiazole are introduced into 130 g of sulphuric acid (96% strength) at 25° C. After 90 minutes' stirring a clear solution has been obtained, to which 31 parts of 50% strength sulphuric acid and 25.8 parts of 42.5% strength nitrosylsulphuric acid are added at an interval of 30 minutes. After a further 30 minutes, the mixture is cooled to 5° C and a solution of 17.6 parts of N-ethyl-N-β-caboxyethyl-m-toluidine in 60 parts of glacial acetic acid is added dropwise at this temperature. After a further 30 minutes, the reaction mixture is poured out onto an ice-water mixture and this mixture is stirred for 4 hours. The dyestuff which has precipitated is filtered off, washed until the wash waters are neutral and then dried. The dyestuff of the formula

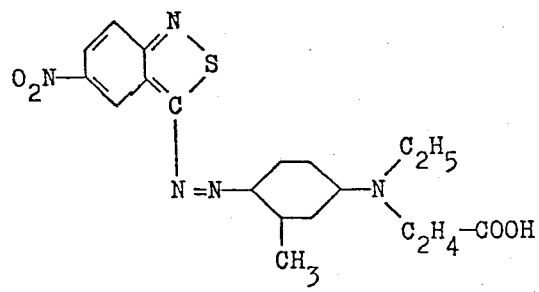

is obtained, which dyes polyester fibres and cellulose 2½-acetate and cellulose triacetate fibres in blue shades.

EXAMPLE 2

13.7 parts of 3-amino-5-nitro-7-bromo-2,1-benzisothiazole are dissolved in 120 parts of 96% strength sulphuric acid at 10°–15° C, the solution is cooled to 0° C and a solution of 42.5 parts of glacial acetic acid and 7.5 parts of propionic acid is added dropwise at 0°–5° C. 25.9 parts of 40.8% strength nitrosylsulphuric acid are then added at 0°–5° C and the mixture is stirred for 3 hours.

The resulting clear solution is subsequently added dropwise, whilst cooling to 0°–5° C, to a previously introduced solution of 10.8 g of N-phenylanthranilic acid in 250 parts of acetone and 75 parts of ice. After 2 hours' stirring, the mixture is poured out onto ice/water and stirred for 2 hours. The dyestuff which has precipitated is filtered off, washed until the wash water reacts neutral, and dried. The dyestuff of the formula

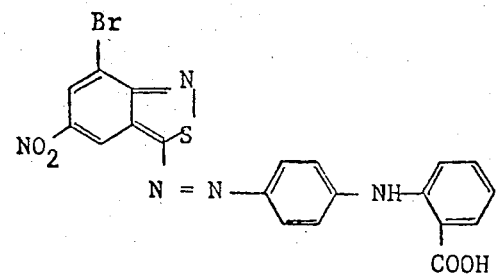

is obtained, which dyes polyester fibres, cellulose 2½-acetate and cellulose triacetate fibres in red-blue shades.

The dyestuffs listed in the table below, of the formula

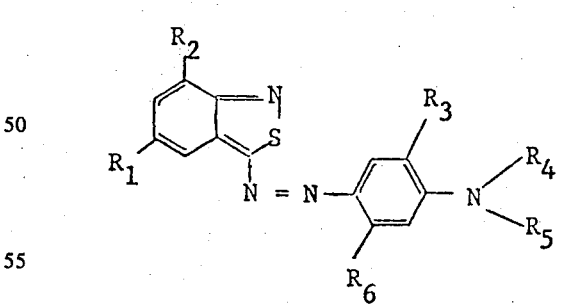

are manufactured according to the data of this example, by diazotisation and coupling. The dyestuffs obtained dye polyester fibres, cellulose 2½-acetate fibres and cellulose triacetate fibres in the shades indicated in the last column.

In Tables I and II below, PES denotes polyester fibres, CA denotes cellulose 2½-acetate and CT denotes cellulose triacetate.

TABLE I

| No. | $R_1$ | $R_2$ | $R_3$ | $R_4$ | $R_5$ | $R_6$ | Shade on PES/CA/CT |
|---|---|---|---|---|---|---|---|
| 1 | H | H | H | —$CH_3$ | —$C_2H_4$—COOH | H | red-blue |
| 2 | $NO_2$ | H | H | -n-$C_4H_9$ | —$C_2H_4$—COOH | H | blue |
| 3 | H | Cl | H | —$C_2H_5$ | —$(CH_2)_3$—COOH | H | blue |
| 4 | Cl | Br | $CH_3$ | —H | —$C_2H_4$COOH | H | blue |
| 5 | Br | Br | H | —$CH_3$ | —$C_2H_4$COOH | —NHCO$(CH_2)_2$COOH | blue |
| 6 | $NO_2$ | Br | H | —$CH_3$ | —$CH_3$ | —NHCOCH$_2$COOH | blue |
| 7 | $NO_2$ | Cl | H | —$C_2H_4$CN | —$C_2H_4$CN | —NHCOCH=CH—COOH | blue |
| 8 | H | $CH_3$ | $CH_3$ | —H | —$C_2H_4$COOH | —NHCOCH$_3$ | blue |
| 9 | $NO_2$ | H | $OCH_3$ | —H | —$C_2H_4$COOH | —NHCOCH$_2$CH$_3$ | green-blue |
| 10 | $NO_2$ | H | $OCH_3$ | —$C_2H_4$OCH$_4$CN | —$C_2H_4$OC$_2$H$_4$CN | —NHCOCH$_2$COOH | green-blue |
| 11 | $NO_2$ | H | $OCH_3$ | —H | —$C_2H_4$COOH | —$CH_3$ | blue |
| 12 | $NO_2$ | H | H | —$C_2H_4$COOH | —$C_2H_4$COOH | —Br | blue |
| 13 | Cl | H | H | —$C_2H_4$COOH | H | | blue |
| 14 | Cl | H | $OCH_3$ | —$C_2H_4$COOH | H | —CH$_2$—Ph / —O—Ph | blue |
| 15 | Br | H | $OCH_3$ | —H | $C_2H_4$OCOCH=CH—COOH | —H | red-blue |
| 16 | Br | H | —H | —H | $C_2H_4$OCOCH=CH—COOH | —$CH_3$ | blue |
| 17 | Br | H | —H | —$CH_3$ | $C_2H_4$OCOCH=CH—COOH | —H | red-blue |

EXAMPLE 3

5.3 parts of 3-aminoindazole were dissolved in 55 parts of hydrochloric acid, diluted with water in the ratio of 4 : 1. 10.5 parts of 4 N sodium nitrite solution were added at 0° C and the mixture was stirred for half an hour. Thereafter, the excess nitrite was destroyed with sulphamic acid. The resulting diazo solution was slowly added to a previously prepared solution of 8.8 g of N-butyl-N-carboxy-ethylaniline in 200 parts of dilute hydrochloric acid at 0° C, whilst stirring. After 1 hour's stirring, the mixture was adjusted to pH 4–5 with sodium acetate and the dyestuff which precipitated, of the formula

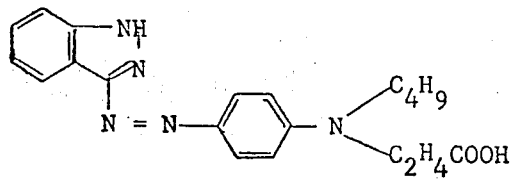

was filtered off and dried. It dyes polyester fibres in yellow shades.

The dyestuffs of the formula

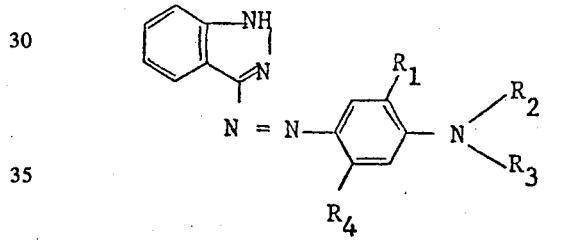

listed in the table below are manufactured in accordance with the instructions of the present example, by diazotisation and coupling. The resulting dyestuffs dye polyester fibres and cellulose acetate fibres in the shades indicated in the last column.

TABLE II

| No. | $R_1$ | $R_2$ | $R_3$ | $R_4$ | Shade on PES/CA/CT |
|---|---|---|---|---|---|
| 1 | H | —$CH_3$ | $C_2H_4$—COOH | H | yellow |
| 2 | H | -n-$C_4H_9$ | $C_2H_4$—COOH | H | yellow |
| 3 | H | —$C_2H_5$ | —$(CH_2)_3$—COOH | H | yellow |
| 4 | $CH_3$ | —H | —$C_2H_4$COOH | H | yellow |
| 5 | H | —$CH_3$ | —$C_2H_4$CN | —NHCO$(CH_2)_2$COOH | reddish-tinged yellow |
| 6 | H | —$CH_3$ | —$CH_3$ | —NHCOCH$_2$COOH | orange |
| 7 | H | —$C_2H_4$CN | —$C_2H_4$CN | —NHCOCH=CH—COOH | reddish-tinged yellow |
| 8 | $CH_3$ | —H | $C_2H_4$COOH | —NHCOCH$_3$ | orange |
| 9 | $OCH_3$ | —H | $C_2H_4$COOH | —NHCOCH$_2$CH$_3$ | orange |
| 10 | $OCH_3$ | —$C_2H_4$OC$_2$H$_4$CN | —$C_2H_4$OC$_2$H$_4$CN | —NHCOCH$_2$COOH | orange |
| 11 | $OCH_3$ | —H | $C_2H_4$COOH | —$CF_3$ | reddish-tinged yellow |
| 12 | H | —$C_2H_4$COOH | $C_2H_4$COOH | —Br | red-yellow |
| 13 | H | —$C_2H_4$COOH | H | | red-yellow |
| 14 | $OCH_3$ | —$C_2H_4$COOH | H | —CH$_2$—Ph / —O—Ph | orange |
| 15 | $OCH_3$ | —H | $C_2H_4$OCOCH=CH—COOH | —H | reddish-tinged yellow |
| 16 | H | —H | $C_2H_4$OCOCH=CH—COOH | —$CH_3$ | reddish-tinged yellow |
| 17 | H | —$CH_3$ | $C_2H_4$OCOCH=CH—COOH | —H | yellow |

EXAMPLE 4

8.9 parts of 3-amino-5-nitroindazole are suspended in 150 parts of 60% strength sulphuric acid. 15.6 parts of 40.8% strength nitrosylsulphuric acid are slowly added at 0° C, whilst stirring, and the mixture is stirred at 0° C until a clear solution is obtained. The diazo solution is slowly added to a previously prepared solution of 9.3 parts of 1-(p-maleinyl-amino)-phenyl-3-methylpyrazolone-5 in 60 parts of 2 N sodium hydroxide solution and 40 parts of water, whilst cooling and stirring. The pH of the coupling solution is kept at between 7 and 7.5 by simultaneous addition of 2 N sodium hydroxide solution. After completion of the addition, the mixture is stirred for 2 hours and the dyestuff which has precipitated, of the formula

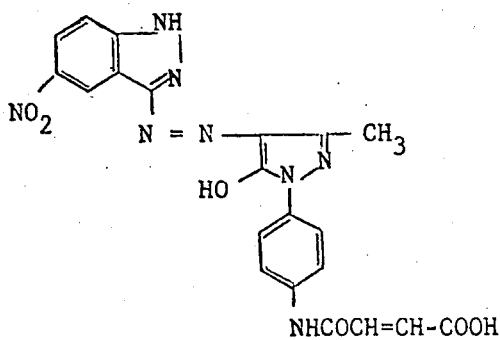

is filtered off and dried. It dyes polyester and acetate fibres in golden yellow shades.

The dyestuffs of the formula

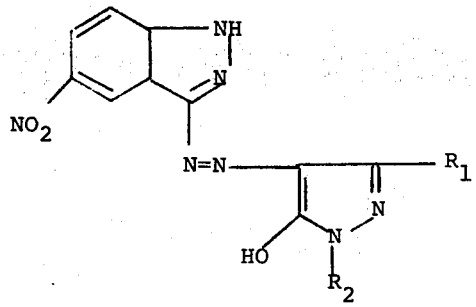

listed in the table below are manufactured in acordance with the instructions of the present example, by diazotisation and coupling. The resulting dyestuffs dye polyester fibres and cellulose acetate fibres in the shades indicated in the last column.

TABLE III

| No. | $R_1$ | $R_2$ | Shade |
|---|---|---|---|
| 1 | —COOH | —C$_6$H$_4$—CH$_3$ | golden yellow |
| 2 | —COOH | 2,4-Cl$_2$—C$_6$H$_3$— | golden yellow |
| 3 | —COOH | —C$_6$H$_4$—CF$_3$ | golden yellow |
| 4 | —COOH | —C$_6$H$_4$—Cl | golden yellow |
| 5 | —COOH | 2,4,5-Cl$_3$—C$_6$H$_2$— | golden yellow |
| 6 | —COOC$_2$H$_5$ | —C$_6$H$_4$—COOH | golden yellow |

EXAMPLE 5

5 parts of 3-amino-5-chloroindazole are dissolved in 12 parts of concentrated hydrochloric acid and 60 parts of water and diazotised with 30 parts of 1 N sodium nitrite solution. The diazo solution is added to a previously prepard solution of 8 parts of 1-methoxy-2-carboxyethylamino-4-propionylaminobenzene in 100 parts of 2 N sulphuric acid, whilst cooling and stirring. The pH-value of the reaction solution is adjusted to 4–5 with sodium acetate and the dyestuff of the formula

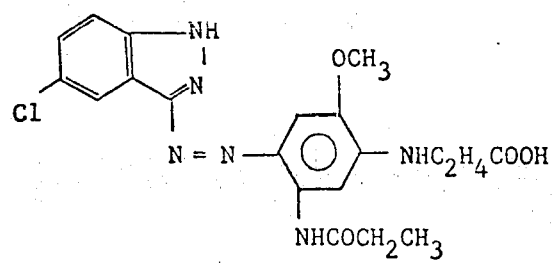

is filtered off. It dyes polyester, cellulose 2½-acetate and cellulose triacetate fibres in orange-red shades.

EXAMPLE 6

133 parts of a 10% strength paste of the dyestuff obtained according to Example 1, 200 parts of 2.5% strength sodium alginate solution and 1.5 parts by volume of 40% strength acetic acid are made up to 1000 parts with water and polyester fabric was padded with this liquor and squeezed out to 75%. The fabric is dried for 1 minute at 120° C and a part of the dried fabric is printed with white resist as follows: a paste of 20 parts of sodium carbonate and 950 parts of 2.5% strength sodium alginate solution is printed in stripes on the fabric. The fabric, as it is, is thermofixed for 1 minute at 200° C and is subsequently thoroughly washed with a solution which contains the adduct of 9 mols of ethylene oxide to 1 mol of nonylphenol. A fabric dyed blue, with a white resist, is obtained.

Additives such as aluminum secondary-butylate or m-nitrobenzenesulphonate can furthermore be added to the printing paste.

The white resist also gives good results if it contains 3–15 parts of sodium hydroxide instead of 20 parts of sodium carbonate.

EXAMPLE 7

1 part of the dyestuff obtained according to Example 1 is ground wet with 2 parts of a 50% strength aqueous solution of the sodium salt of dinaphthylmethanedisulphonic acid.

This dyestuff preparation is stirred with 40 parts of a 10% strength aqueous solution of the sodium salt of N-benzyl-$\mu$-heptadecyl-benzimidazoledisulphonic acid and 4 parts of a 40% strength acetic acid solution are added. A dyebath of 4000 parts is prepared therefrom by dilution with water. 100 parts of a cleaned polyester fibre material are introduced into this bath at 50° C, the temperature is raised to 120°–130° C over the course of half an hour, and dyeing takes place for 1 hour at this temperature, with the vessel closed. Thereafter the material is thoroughly rinsed. A strong, pure blue dyeing is obtained.

I claim:

1. An azo compound free of sulfonic acid groups, of the formula

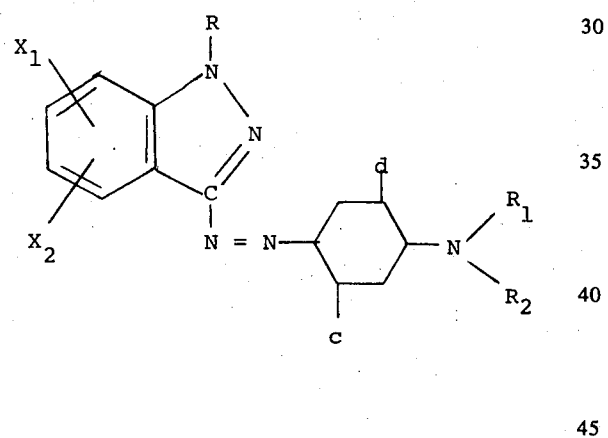

wherein $X_1$ and $X_2$ are independently selected from the group consisting of hydrogen, nitro, chloro, bromo and methyl;

R is hydrogen, c and d each are hydrogen, methyl, ethyl, methoxy, ethoxy, phenylthio or phenoxy and c additionally denotes chlorine, bromine, trifluoromethyl, acetylamino, propionylamino, methylsulfonylamino, ethylsulfonylamino, p-toluenesulfonylamino, methoxycarbonyl, phenoxycarbonyl, aminocarbonyl, benzyl, —NH—CO—($CH_2$)$_n$—COOH, where $n$=0, 1, 2, or 3, or —NH—CO—CH=CH—COOH; and $R_1$ and $R_2$ are each hydrogen, lower alkyl, benzyl, $\beta$-phenylethyl, $\beta$-chloroethyl, $\beta,\beta,\beta$-trifluoroethyl, $\beta,\gamma$-dichloropropyl, $\beta$-cyanoethyl, $\beta$-ethoxyethyl, $\delta$-methoxybutyl, glycidyl, $\beta$-hydroxyethyl, $\beta,\gamma$-hydroxypropyl, $\beta$-nitroethyl, $\beta$-carbo-(methoxy-, ethoxy- or propoxy-) ethyl, $\beta$- or $\gamma$-carbo-(methoxy- or ethoxy-) propyl, $\beta$-(acetyl- or formyl-) aminoethyl, $\beta$-acetoxyethyl, $\beta,\gamma$-diacetoxypropyl, $\gamma$-butyryloxypropyl, $\beta$-phenylsulphonylethyl, $\beta$-toluenesulphonylethyl, $\beta$-(p-chlorobenzenesulfonyl)ethyl, $\beta$-methylcarbamyloxyethyl, $\beta$-phenylcarbamyloxyethyl, $\beta$-(methoxy-, ethoxy or isopropoxy-)carbonyloxyethyl, $\gamma$-acetamidopropyl, $\beta$-(p-nitrophenoxy)ethyl, $\beta$-(p-hydroxyphenoxy)ethyl, $\beta(\beta'$-acetylethoxycarbonyl)ethyl, $\beta$-[($\beta'$-cyano-, hydroxy-, methoxy- or acetoxy-) ethoxycarbonyl] ethyl, cyanoethoxyethyl, —$C_2$—$C_3$-alkylene—COOH, $\beta$-acetylethyl, $\gamma$-aminopropyl, $\beta$-diethylaminoethyl, $\beta$-cyanoacetoxyethyl, carboxyphenyl or —$C_2H_4$—O—CO—CH=$\lambda$CH—COOH with the proviso that one of c, $R_1$ and $R_2$ is substituted by a carboxy group, or both $R_1$ and $R_2$ are substituted by a carboxy group.

2. An azo compound as claimed in claim 1 of the formula

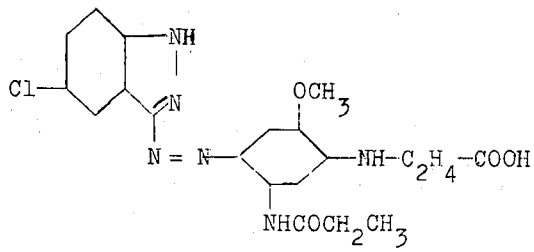

3. An azo dyestuff of the formula

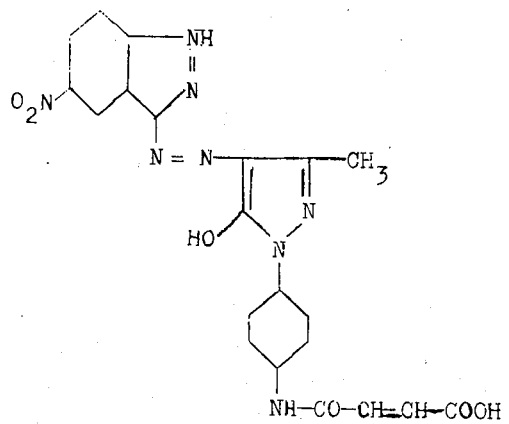

* * * * *

UNITED STATES PATENT OFFICE
CERTIFICATE OF CORRECTION

PATENT NO. : 3,985,726
DATED : October 12, 1976
INVENTOR(S) : Klaus Artz

It is certified that error appears in the above-identified patent and that said Letters Patent are hereby corrected as shown below:

Claim 1, column 16, line 21, delete "$C_2H_4-O-CO-CH=$ should read -- $-C_2H_4-O-CO-CH=CH-$ --.

Signed and Sealed this

First Day of February 1977

[SEAL]

Attest:

RUTH C. MASON
*Attesting Officer*

C. MARSHALL DANN
*Commissioner of Patents and Trademarks*